(12) United States Patent
Jamart et al.

(10) Patent No.: US 12,202,757 B2
(45) Date of Patent: Jan. 21, 2025

(54) METHOD FOR OBTAINING A CURVED LAMINATED GLAZING UNIT

(71) Applicant: SAINT-GOBAIN GLASS FRANCE, Courbevoie (FR)

(72) Inventors: Juliette Jamart, Compiegne (FR); Leila Dumotier, Margny les Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 374 days.

(21) Appl. No.: 17/636,683

(22) PCT Filed: Sep. 30, 2020

(86) PCT No.: PCT/EP2020/077393
§ 371 (c)(1),
(2) Date: Feb. 18, 2022

(87) PCT Pub. No.: WO2021/064035
PCT Pub. Date: Apr. 8, 2021

(65) Prior Publication Data
US 2022/0298052 A1     Sep. 22, 2022

(30) Foreign Application Priority Data

Sep. 30, 2019   (FR) ...................................... 1910774

(51) Int. Cl.
*C03B 23/03*     (2006.01)
*B32B 17/10*     (2006.01)
(Continued)

(52) U.S. Cl.
CPC ........ *C03B 23/03* (2013.01); *B32B 17/10036* (2013.01); *B32B 17/10348* (2013.01);
(Continued)

(58) Field of Classification Search
None
See application file for complete search history.

(56) References Cited

U.S. PATENT DOCUMENTS

| 5,093,285 A * | 3/1992 | Murkens | ................. C03C 17/02 |
| | | | 502/79 |
| 2018/0141858 A1 | 5/2018 | Kharchenko et al. | |
| 2021/0340060 A1* | 11/2021 | Jamart | .............. B32B 17/10229 |

FOREIGN PATENT DOCUMENTS

| EP | 3 450 193 A1 | 3/2019 |
| WO | WO 2005/068381 A1 | 7/2005 |
| WO | WO 2018/115090 A1 | 6/2018 |

OTHER PUBLICATIONS

WO2005068381 machine translation, Turc Virginie, Method for Bending Glass Sheets, Jul. 2005 (Year: 2005).*

(Continued)

*Primary Examiner* — Queenie S Dehghan
(74) *Attorney, Agent, or Firm* — Pillsbury Winthrop Shaw Pittman LLP

(57) ABSTRACT

A method for obtaining a curved laminated glazing unit, includes applying an enamel coating to a part of a first face of a first glass sheet so as to create at least one enameled zone and at least one unenameled zone, applying a sacrificial layer to a part, called the sacrificial zone, of a first face of a second glass sheet, simultaneously bending the first and second glass sheets, the sacrificial zone being disposed at least in line with at least one part of an enameled zone, removing the sacrificial layer, either during the bending or after the bending step, and laminating the first and second glass sheets by a thermoplastic interlayer.

19 Claims, 2 Drawing Sheets

(51) Int. Cl.
  *B60J 1/00*    (2006.01)
  *C03C 17/00*   (2006.01)
  *C03C 17/04*   (2006.01)
  *C03C 27/10*   (2006.01)
  *B60J 1/02*    (2006.01)

(52) U.S. Cl.
  CPC ......... *B32B 17/10761* (2013.01); *B60J 1/001* (2013.01); *C03C 17/009* (2013.01); *C03C 17/04* (2013.01); *C03C 27/10* (2013.01); *B32B 2605/006* (2013.01); *B60J 1/02* (2013.01); *C03C 2217/445* (2013.01); *C03C 2217/485* (2013.01); *C03C 2218/119* (2013.01); *C03C 2218/355* (2013.01)

(56) References Cited

OTHER PUBLICATIONS

WO 2018115090 machine translation, Yannick Sartenaer et al., Laminated Glazing, Jun. 2018 (Year: 2018).*
International Search Report as issued in International Patent Application No. PCT/EP2020/077393, dated Dec. 21, 2020.

* cited by examiner

[Fig. 1A]
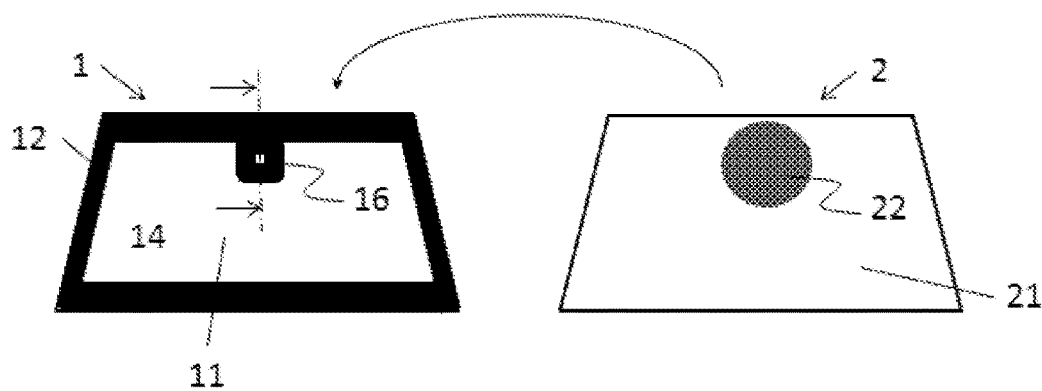
[Fig. 1B]
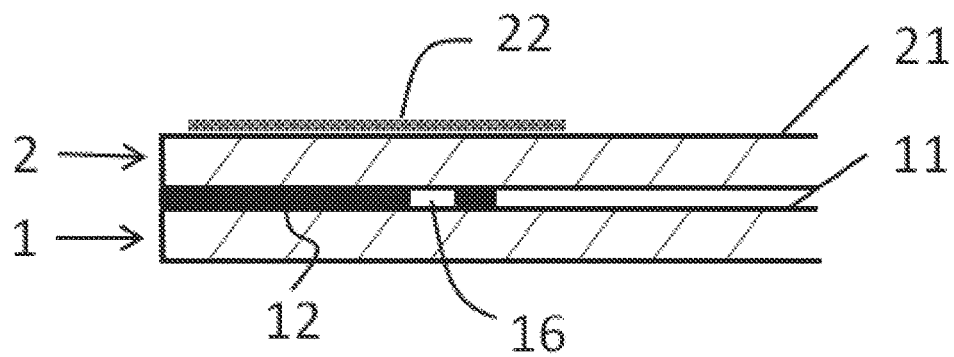
[Fig. 1C]
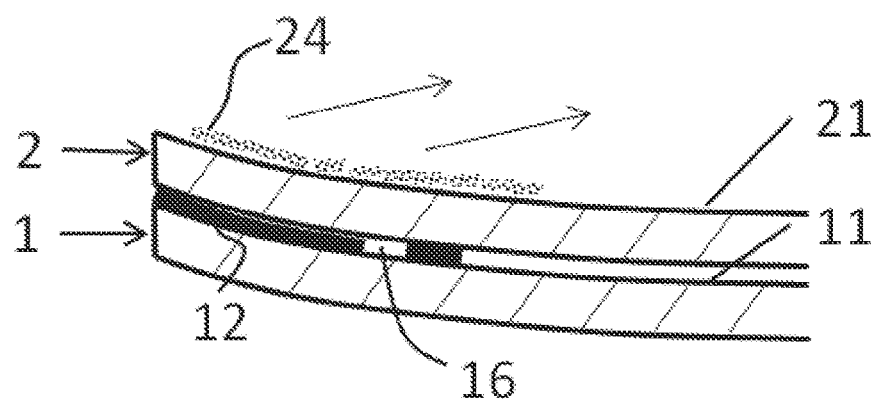

[Fig. 1D]
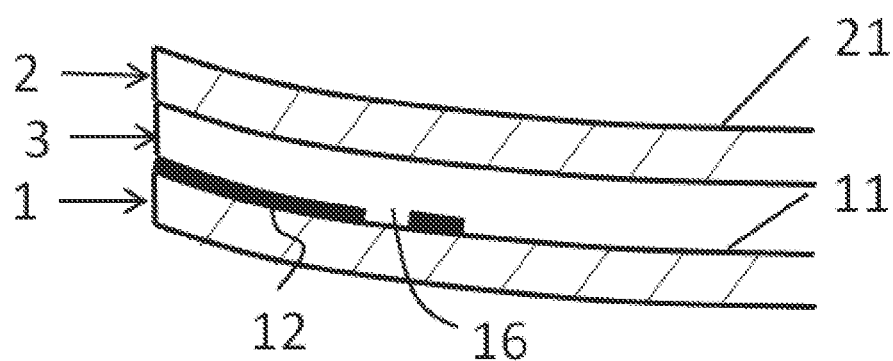
[Fig. 2]
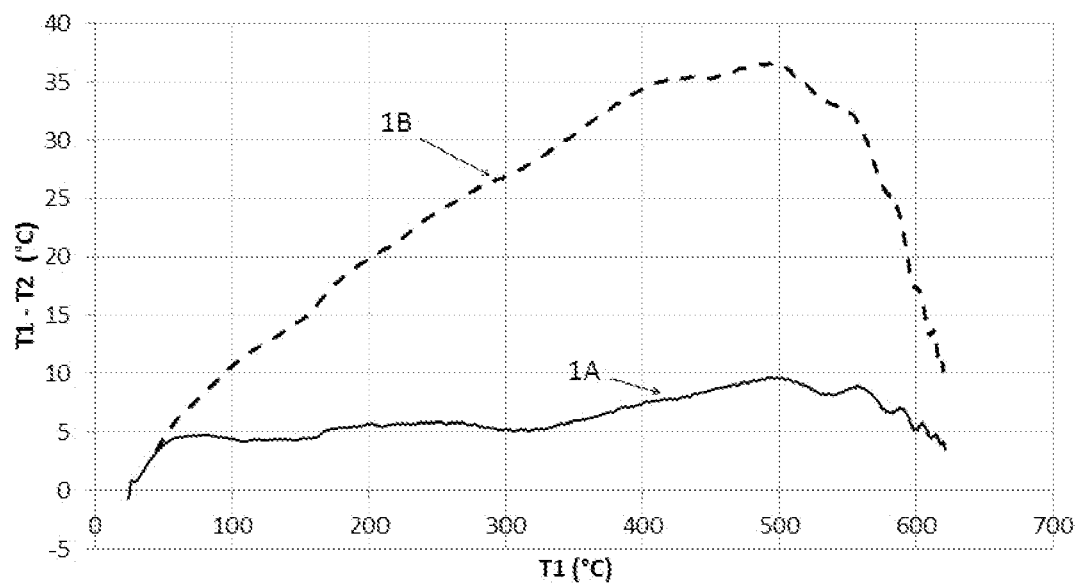

METHOD FOR OBTAINING A CURVED LAMINATED GLAZING UNIT

CROSS-REFERENCE TO RELATED APPLICATIONS

This application is the U.S. National Stage of PCT/EP2020/077393, filed Sep. 30, 2020, which in turn claims priority to French patent application number 1910774 filed Sep. 30, 2019. The content of these applications are incorporated herein by reference in their entireties.

The invention pertains to the field of laminated glazing units. It relates more particularly to a method which employs bending and enables the production of products of better quality in terms of optical properties.

Laminated glazing units are glazing units which comprise two glass sheets bonded adhesively to one another by a thermoplastic interlayer. The benefit of this interlayer more particularly is to retain the shards of glass in the event of breakage, but it also provides other functionalities, more particularly in terms of break-in resistance or enhancement of acoustic properties. Glazing units of this kind are used in particular as automotive windshields, in which case they are curved. The glass sheet disposed to the convex side, called the external sheet as it is intended for positioning on the exterior of the vehicle, comprises a face referred to as "face 1" (on the exterior of the vehicle) and a face 2 in contact with the lamination interlayer, and the glass sheet disposed to the concave side, called the internal sheet, comprises a face 3 in contact with the lamination interlayer and a face 4 intended for positioning on the interior of the vehicle.

These laminated glazing units generally comprise enamel coatings, which make it possible, for example, to conceal assembly joints of the glazing unit in a vehicle bodywork aperture and also to protect said joints from ultraviolet radiation. The enamel, often disposed on face 2 or on face 4, is generally in the form of a strip disposed at the periphery of the glass sheet.

The enamel comprises a glass frit and pigments, often black pigments. Generally applied by screen printing, it is subsequently baked during bending, thereby subjecting the glass sheets to temperatures of at least 550° C., and even of at least 600° C. This treatment is implemented in heating devices such as ovens, in which the glass sheets are heated by convection and radiation.

The curved laminated glazing units have been observed to exhibit, in some cases, optical distortions, sometimes referred to as "burn lines", in the vicinity of the enameled zone.

These distortions are particularly disruptive when they are located close to zones, called "camera zones", through which optical sensors have to sense the light or images. This is the case, for example, for windshields equipped with sensors and/or cameras, for example rain sensors or lightness sensors, or with driving aid cameras. These sensors or cameras are situated on the interior of the vehicle, against face 4 of the glazing unit, for example in the zone in which the interior rear-view mirror is attached to the windshield. An enamel coating is generally disposed in this zone in order to conceal and protect the adhesive used to attach the interior rear-view mirror; however, this enameled zone is required to provide for a small unenameled transmission window such that the light is able to reach the sensors. It is important for this camera zone to be free from optical distortions, so as to prevent the captured image from being deformed and possibly misanalyzed.

It has become apparent that such distortions are due to the fact that the enamel, in particular when it is black, absorbs infrared radiation to a high degree, more than the bare glass. The result of this, during bending, are sharp temperature differences between, on the one hand, the zones coated with the enamel (enameled zones) and, on the other hand, the glass zones not coated with the enamel (unenameled zones); these temperature differences are the origin of the distortions observed.

The aim of the invention is to prevent these disadvantages by reducing or suppressing said optical distortions.

For this purpose, the subject of the invention is a method for obtaining a curved laminated glazing unit possessing a concave side and a convex side, said glazing unit comprising a glass sheet, called the internal glass sheet, disposed to the concave side of the glazing unit and bonded adhesively by means of a thermoplastic interlayer with a glass sheet, called the external glass sheet, disposed to the convex side of the glazing unit, said method comprising the following steps:

applying an enamel coating to a part of a first face of a first glass sheet so as to create at least one enameled zone and at least one unenameled zone, applying a sacrificial layer to a part, called the sacrificial zone, of a first face of a second glass sheet, simultaneously bending the first and second glass sheets, the glass sheets being disposed during bending so that one of the first and second glass sheets is disposed on the other glass sheet, the respective first faces of each glass sheet are oriented toward the concave side of the glazing unit, and the sacrificial zone is disposed at least in line with at least one part of an enameled zone, removing said sacrificial layer, either during bending or after the bending step, laminating the first and second glass sheets by means of a thermoplastic interlayer.

In the majority of cases, corresponding to the most common bending methods, the respective first faces of each glass sheet will be turned upward during bending. Likewise, usually, the lamination will be carried out so that the glass sheet disposed on top during bending is the internal sheet.

According to a first embodiment, the internal glass sheet is the first glass sheet. In this case, the enameled glass sheet will generally be disposed on top of the second glass sheet during bending, and the enamel coating will be disposed on face 4 of the final glazing unit, and will therefore be intended for contact with the interior of the vehicle in which the glazing unit will be installed.

According to a second embodiment, it is the external glass sheet that is the first glass sheet. In this case, the second glass sheet will generally be disposed on top of the enameled glass sheet during bending, and the enamel coating will be disposed on face 2 of the final glazing unit, and hence in contact with the lamination interlayer.

In all cases, in the final glazing unit, the enamel coating will generally be disposed on face 2, and hence on the internal face of the external sheet, or on face 4, and hence on the internal face of the internal sheet.

All of the text below applies to both these embodiments, unless otherwise specified.

Each glass sheet is preferably flat before the bending step. The glass of the first and/or second glass sheet is typically a soda-lime-silica glass, although other glasses, for example borosilicates or aluminosilicates, may also be employed. At least one glass sheet is preferably obtained by floating, i.e., by a process which comprises discharging the molten glass onto a bath of molten tin.

At least one glass sheet may be clear or tinted, for example in green, blue, gray or bronze. The choice is made depending on the use of the final glazing unit. In the case, for example, of an automotive windshield, the light transmittance of the glazing unit (illuminant A, CIE-1931 reference observer) is preferably at least 70%, and even 75%; in that case, at least one sheet of preferably comprises an iron oxide content (expressed in the $Fe_2O_3$ form) of between 0.5% and 0.9% by weight.

Each glass sheet preferably has a thickness within a range from 0.7 to 6 mm, in particular from 1 to 5 mm, more particularly from 2 to 4 mm. The glazing unit preferably has a surface area of at least 1 $m^2$.

The enamel coating is preferably applied from a fluid enamel composition comprising a glass frit, pigments, and an organic medium. The latter is removed during the bending step, thereby allowing the enamel coating to consolidate, or even, where appropriate, during a prebaked treatment of the enamel. After baking, the enamel coating therefore comprises pigments in an essentially vitreous matrix.

The glass frit or the vitreous matrix is preferably based on a zinc and/or bismuth borosilicate. The pigments preferably comprise one or more oxides selected from the oxides of chromium, copper, iron, manganese, cobalt, and nickel. The species in question may, for example, be iron and/or copper chromates. The thickness of the enamel coating, after the heat treatment step, is preferably within a range from 5 to 50 μm, in particular from 10 to 40 μm.

The enameled zone represents preferably between 2% and 25%, in particular between 3% and 20%, or even between 5% and 15% of the surface area of the coated face. The enameled zone preferably takes the form of a peripheral strip. A "peripheral strip" refers to a strip which is closed on itself and which, from each point on the periphery of the glass sheet, extends toward the interior of the glass sheet over a certain width, which is often variable according to the position and which is typically between 1 and 30 cm.

The enamel coating is preferably applied by screen printing of a fluid enamel composition comprising a glass frit, pigments, and an organic medium. For this purpose, the enamel composition is applied, in particular by means of a doctor blade, to the glass sheet through meshes of a screen-printing screen. The meshes of the screen are closed off in the part corresponding to the zones of the glass sheet that are not to be coated, so that the enamel composition is able to pass through the screen only in the zones to be printed, according to a predefined pattern.

Other application techniques are also possible, such as the techniques of digital printing (for example inkjet printing or transfer printing under the effect of laser radiation).

Before baking, the enamel coating has a thickness of preferably between 10 and 30 μm, in particular between 15 and 25 μm. After baking, the thickness of the enamel coating is preferably between 5 and 15 μm, in particular between 7 and 13 μm.

The enamel is preferably black, and advantageously exhibits a colorimetric coordinate L* in reflection on the enamel side of less than 10, in particular less than 5, and even less than 3.

The sacrificial layer is applied to the second glass sheet in a sacrificial zone which, during bending, is disposed at least in line with (in other words, opposite) at least one part of an enameled zone.

The presence of this layer on the second glass sheet enables compensation of the temperature differences which arise during bending at the border between the enameled zones and the unenameled zones of the first glass sheet, and therefore prevention of the aforementioned optical distortions from forming.

The sacrificial layer, moreover, may also be disposed in line with (in other words, opposite) a part of an unenameled zone, more particularly adjacent to an enameled zone.

The sacrificial layer may be disposed in line with at least 5%, in particular at least 10%, and even at least 20%, or else with at least 30% or 40% of the enameled zone, and even with at least 50% or 60% of the enameled zone.

According to one example, the sacrificial zone is disposed, at least or exactly, in line with the entirety of the enameled zone. The sacrificial zone is disposed, for example, in line with the entirety of the enameled zone and with a part of the unenameled zone adjacent to the enameled zone.

According to another example, the sacrificial zone is disposed in line with a camera zone, therefore encompassing an unenameled zone surrounded by an enameled zone and a part of this latter zone around the unenameled zone. As indicated above, a camera zone is a zone of the glazing unit through which, in the final glazing unit, sensors are required to sense the light or the images, and also the adjacent enameled zone.

In this case, the sacrificial zone will generally be disposed in line with a zone covering from 0.5% to 10%, or even 1% to 5% of the enameled zone. The sacrificial zone will also, preferably, be disposed in line with the unenameled zone surrounded by this enameled zone.

The camera zone, in its transparent part, preferably has a trapezoidal shape. The surface area of the transparent part of the camera zone is preferably between 5 and 300 $cm^2$, in particular between 10 and 250 $cm^2$.

The sacrificial layer is preferably applied by screen printing, digital printing, by pad printing or by roll coating, curtain coating or spray coating.

The processes of screen printing, digital printing or else pad printing enable the application of the sacrificial layer only to specified zones. These techniques of localized application are particularly useful, for example, when the aim of the invention is to prevent optical distortions in a camera zone, since in this case only a small zone of glass sheet is affected by the method according to the invention.

The thickness of the sacrificial layer is preferably between 100 nm and 80 μm, in particular between 1 μm and 30 μm, or even between 5 μm and 20 μm.

The sacrificial layer preferably absorbs a part of the infrared radiation. It advantageously comprises pigments, in particular black pigments, or carbon black. The pigments preferably comprise one or more oxides selected from the oxides of chromium, copper, iron, manganese, cobalt, and nickel.

Alternatively or cumulatively, the sacrificial layer may reflect a part of the infrared radiation. In that case it may comprise pigments which reflect the infrared radiation, in particular titanium dioxide pigments.

To enable the sacrificial layer to resist various handling or manipulating operations, for example conveying or tool contact, the sacrificial layer preferably comprises a resin. The resin then acts as a binder, allowing the temporary fastening of the layer to the second glass sheet.

According to one embodiment, the sacrificial layer comprises a resin and refractory mineral compounds, for example pigments or carbon black, and the sacrificial layer is removed after the bending step, in particular by washing and/or brushing. By "refractory" is meant that these compounds do not melt and do not soften during bending.

According to another embodiment, the sacrificial layer comprises a resin and combustible mineral compounds, the sacrificial layer being removed simultaneously with the bending. In this case, the combustible compounds are removed by combustion during bending. By "combustible" minerals are meant, indeed, those compounds which are capable of burning during bending.

In both cases, the resin will generally be removed either during bending or, where appropriate, before bending by a prebaked treatment of the enamel.

The resin content of the sacrificial layer is preferably at least 10% by weight, or at least 20% and/or at most 60% by weight.

The resin may in particular be selected from acrylic resins, epoxy resins, alkyd resins and polyurethane resins, alone or in a mixture, in aqueous or solvent phase. Copolymers of these various polymers can also be used. The resin may be in aqueous or solvent phase, with a solids content of typically between 20% and 80%, in particular between 30% and 70%, by weight.

The resin may be a resin which crosslinks under ultraviolet radiation, based in particular on (meth)acrylates and optionally on a photoinitiator; a resin without solvent, or optionally in aqueous or solvent phase. The resin may not be crosslinked if there is no need for the glass sheet to be handled between the application of the sacrificial layer and the heat treatment. If this is not the case, it is preferable to provide a drying step by ultraviolet radiation.

The resin may be a latex, i.e., in the form of an aqueous emulsion or dispersion. Drying may take place in the air or in the oven; however, the drying step may be omitted if there is no need for the glass sheet to be handled between the application of the sacrificial layer and the heat treatment.

The resin may be a thermoplastic resin, for example a hotmelt resin, or a thermoplastic elastomer, for example an SEBS copolymer (polystyrene-b-poly(ethylene-butylene)-b-polystyrene).

The resin may be the resin of an organic medium for an enamel composition.

The bending preferably employs temperatures of preferably between 600 and 750° C., in particular between 620 and 700° C. If necessary, the bending may be followed by a thermal tempering treatment which also includes rapid and forced cooling of the surface of the glass, with the aid, for example, of air nozzles, so as to create superficial compressive stresses which improve the mechanical strength of the glass sheet.

The bending may be carried out conventionally, for example by gravity (with the glass deforming under its own weight) or by pressing. During bending, the interior glass sheet (according to the case, the first or the second glass sheet) is often disposed on top of the exterior glass sheet (according to the case, the second or the first glass sheet). To prevent them from sticking to one another during bending, the glass sheets are preferably held separate by disposing between them an insert powder which ensures a spacing of a few tens of micrometers, typically from 20 to 50 µm. The insert powder is based, for example, on calcium and/or magnesium carbonate.

The method may further comprise, before the bending step, a prebaked treatment of the enamel. In that case this treatment employs temperatures of preferably between 550 and 650° C., in particular between 560 and 600° C. The prebaked treatment is useful more particularly for developing the antiadhesion properties of certain enamels. This embodiment is appreciated particularly when the first coating is an enamel intended for face 2 of the laminated glazing unit, with said enamel in that case generally being in contact with the second glass sheet of the laminated glazing unit during the bending treatment.

As indicated above, the method may comprise, after the bending step, a step of washing and/or brushing. This step allows the removal of any organic and/or mineral residues or compounds of the sacrificial layer, for example pigments.

After the bending step, the method comprises a step of lamination, in which the glass sheets are bonded to one another by means of a thermoplastic interlayer.

The lamination may be carried out conventionally by an autoclave treatment, at temperatures, for example, of 110 to 160° C., and under a pressure of from 10 to 15 bar. Prior to the autoclave treatment, the air trapped between the glass sheets and the lamination interlayer may be removed by calendering or by pressure reduction.

The lamination interlayer preferably comprises at least one sheet of polyvinyl acetal, in particular of polyvinyl butyral (PVB).

The lamination interlayer may be tinted or untinted, in order, if necessary, to regulate the optical or thermal properties of the glazing unit. The lamination interlayer may advantageously possess acoustic absorption properties so as to absorb airborne or structure-borne sounds. It may in particular consist, for this purpose, of three polymeric sheets, including two PVB sheets, called outer sheets, surrounding an inner polymeric sheet, optionally made of PVB, whose hardness is lower than that of the outer sheets. The lamination interlayer may also possess thermal insulation properties, more particularly infrared radiation reflection properties. For this purpose, it may comprise a low-emissivity thin-layer coating, for example a coating comprising a thin layer of silver or a coating of alternating dielectric layers having different refractive indices, applied to an inner PET sheet surrounded by two outer PVB sheets.

The thickness of the lamination interlayer is generally within a range from 0.3 to 1.5 mm, in particular from 0.5 to 1 mm. The thickness of the lamination interlayer may be lower on one edge of the glazing unit than at the center of the glazing unit, in order to prevent a double image forming when using a head-up display (HUD) system.

According to one embodiment, a sensor is disposed on the internal glass sheet opposite an unenameled zone surrounded by a part of the enameled zone (camera zone). The sensor is, for example, a camera (in particular visible and/or infrared, more particularly thermal) or a Lidar.

The resulting curved laminated glazing unit comprises two glass sheets bonded adhesively by means of a thermoplastic interlayer, with an enamel coating (in particular black) being disposed advantageously at the periphery of one of the glass sheets, on face 2 or on face 4 of the glazing unit. By means of the peripheral enamel it is possible to conceal and protect the joints and adhesives which allow the glazing unit to be attached to the bodywork aperture or the interior rear-view mirror to be attached to the glazing unit. The windshield preferably comprises at least one sensor, and the peripheral enamel strip comprises an unenameled transmission window opposite said sensor.

The examples which follow illustrate the invention without limitation, in association with the attached FIGS. 1 and 2.

FIGS. 1A to 1D illustrate schematically one embodiment of the method of the invention. In this embodiment, the objective is to reduce the optical distortions in a camera zone of an automotive windshield.

FIG. 1A is a schematic plan view of the first and second glass sheets before they are assembled for the purpose of bending.

The first glass sheet 1 is coated on its first face 11 with a peripheral strip of black enamel 12 surrounding an unenameled zone 14 (central zone of the glass sheet) and creating, in the upper central part of the glass sheet, a camera zone 16, comprising an unenameled, transparent part surrounded by an enameled part. Enamel is applied, for example, by screen printing. At this stage, the enamel is not yet baked.

The second glass sheet 2 is coated on its first face 21 with a sacrificial layer 22, disposed in a sacrificial zone intended for siting in line with (opposite) the camera zone 16 when the glass sheets are assembled for the purpose of bending. In the example, the sacrificial layer extends both in line with the transparent, and thus unenameled, part of the camera zone 16, and in line with the enameled part sited around this transparent part.

The sacrificial layer 22 comprises, for example, a resin and black pigments.

FIG. 1B is a schematic sectional view, along the sectional plane represented in FIG. 1A, of a part of the first and second glass sheets assembled for the purpose of bending. The second glass sheet 2 is here disposed on the first glass sheet 1. In the final glazing unit, therefore, the second glass sheet 2 will be the internal glass sheet, and the first glass sheet 1, therefore, will be the external glass sheet, with the enamel coating then located on face 2 of the glazing unit. As indicated above, the reverse arrangement is also possible, whereby the enamel is intended to be on face 2 or 4 of the final laminated glazing unit. The insert powder which is generally present between the two glass sheets is not shown here.

The first faces 11 and 21 are oriented toward the side which during bending will become the concave side of the glazing unit. As the bending in this case is by gravity, the first faces 11 and 21 are turned upward. Other dispositions are possible, depending on the bending process used.

FIG. 1C is a sectional view of the first and second glass sheets at the end of bending. In the sacrificial layer example given, the combustion of the resin has left the black pigments, represented by the reference 24, on the first face 21 of the second glass sheet 2, and these pigments may be removed from the face 21 by brushing.

FIG. 1D is a sectional view of the final laminated glazing unit. After bending, the two glass sheets are separated and then laminated with a thermoplastic interlayer 3, typically made of PVB.

FIGS. 1A to 1D illustrate only one embodiment of the method according to the invention. Other embodiments are of course possible, for example the sacrificial layer 22 may be applied in line with the entire enameled zone 12 so as to eliminate the optical distortions present at the interface of the enameled zone 12 and the unenameled zone 14.

The exemplary embodiment which follows demonstrates the advantages of the invention.

A first glass sheet was coated by screen printing, over half of its first face, with a black enamel coating. A second glass sheet was then disposed on top of the first glass sheet, the two sheets then being heat treated by being placed in an oven heated to a temperature of 710° C. for a duration of 180 seconds. The change in the temperature of the glass (measured by thermocouples situated on the first glass sheet) in the enameled zone (T1) and in the unenameled zone (T2) were measured.

In test 1A, the first face of the second glass sheet (turned upward during the heat treatment) was coated beforehand by screen printing with a composition consisting of an organic medium and black mineral pigments based on oxides of copper (37% by mass), of iron (17% by mass) and of manganese (46% by mass). The wet thickness was 15 µm. In this example, the heat treatment enabled the sacrificial layer to be removed by combustion of the resin, leaving the pigments on the surface of the second glass sheet, which were subsequently removed by washing.

In test 1B (comparative), no sacrificial layer was applied.

FIG. 2 presents the temperature difference T1-T2 as a function of the temperature T1.

The results show that the sacrificial layer on the second glass sheet enables a sharp reduction in the temperature difference at high temperature between the enameled and unenameled zones, the difference being 10° C. at most as an absolute value in the case of example 1A, while possibly being up to more than 35° C. in the absence of a sacrificial layer.

The invention claimed is:

1. A method for obtaining a curved laminated glazing unit possessing a concave side and a convex side, said glazing unit comprising a glass sheet, forming an internal glass sheet, disposed to the concave side of the glazing unit and bonded adhesively by a thermoplastic interlayer with another glass sheet, forming an external glass sheet, disposed to the convex side of the glazing unit, said method comprising:
   applying an enamel coating to a part of a first face of a first glass sheet so as to create at least one enameled zone and at least one unenameled zone,
   applying a sacrificial layer to a part of a first face of a second glass sheet, said part of the first face of the second glass sheet forming a sacrificial zone,
   simultaneously bending the first and second glass sheets, the first and second glass sheets being disposed during bending so that one of the first and second glass sheets is disposed on the other one of the first and second glass sheets, the respective first faces of each of the first and second glass sheets are oriented toward the concave side of the glazing unit, and the sacrificial zone is disposed at least in line with at least one part of an enameled zone,
   removing said sacrificial layer, either during bending or after the bending step,
   laminating the first and second glass sheets with a thermoplastic interlayer.

2. The method as claimed in claim 1, wherein the internal glass sheet is the first glass sheet.

3. The method as claimed in claim 1, wherein the external glass sheet is the first glass sheet.

4. The method as claimed in claim 1, wherein the enameled zone takes the form of a peripheral strip.

5. The method as claimed in claim 1, wherein the enamel coating is applied from a fluid enamel composition comprising a glass frit, pigments, and an organic medium.

6. The method as claimed in claim 1, wherein the sacrificial zone is disposed in line with a camera zone.

7. The method as claimed in claim 1, wherein the sacrificial layer is applied by screen printing, digital printing, by pad printing or by roll coating, curtain coating or spray coating.

8. The method as claimed in claim 1, wherein the sacrificial layer absorbs a part of the infrared radiation.

9. The method as claimed in claim 8, wherein the sacrificial layer comprises pigments.

10. The method as claimed in claim 9, wherein the pigments are black pigments, or carbon black pigments.

11. The method as claimed in claim 1, wherein the sacrificial layer comprises a resin and refractory mineral compounds, the sacrificial layer being removed after the bending step.

12. The method as claimed in claim 11, wherein the sacrificial layer is removed by washing and/or brushing.

13. The method as claimed in claim 1, wherein the sacrificial layer comprises a resin and combustible mineral compounds, the sacrificial layer being removed simultaneously with the bending.

14. The method as claimed in claim 1, further comprising, before the bending step, a prebaked treatment of the enamel.

15. The method as claimed in claim 1, wherein the glazing unit is an automotive windshield.

16. The method as claimed in claim 1, wherein at least one sensor is disposed on the internal glass sheet opposite an unenameled zone surrounded by a part of the enameled zone.

17. The method as claimed in claim 16, wherein said at least one sensor is a camera.

18. The method as claimed in claim 17, wherein said camera is a visible and/or infrared camera.

19. The method as claimed in claim 17, wherein the camera is a thermal camera or a Lidar.

\* \* \* \* \*